United States Patent [19]
Fraden

[11] 4,450,351
[45] May 22, 1984

[54] MOTION DISCONTINUANCE DETECTION SYSTEM AND METHOD

[75] Inventor: Jacob Fraden, Hamden, Conn.

[73] Assignee: Bio/Optical Sensor Partners, Ltd., Oberlin, Ohio

[21] Appl. No.: 469,467

[22] Filed: Feb. 24, 1983

Related U.S. Application Data

[63] Continuation of Ser. No. 249,068, Mar. 30, 1981.

[51] Int. Cl.³ ............................................ H05B 39/04
[52] U.S. Cl. .................................. 250/221; 307/117; 315/159; 315/360; 340/527; 340/530; 362/276; 362/802
[58] Field of Search ................ 250/221; 315/159, 360; 340/526–530, 555–557, 573; 307/116–117; 362/276, 802; 358/105

[56] References Cited

U.S. PATENT DOCUMENTS 2,016,036 10/1935 Fitzgerald .
3,459,961 8/1969 Ravas ............................ 362/276 X
4,305,021 12/1981 Schreiden ........................ 315/159

Primary Examiner—David C. Nelms
Assistant Examiner—Edward P. Westin
Attorney, Agent, or Firm—Pearne, Gordon, Sessions, McCoy, Granger & Tilberry

[57] ABSTRACT

A motion detection system is disclosed which utilizes a lens or other imaging device to be responsive to motion in a particular field of view in a room, for example, and pass illumination to a photocell. The photocell or a screen in front thereof establishes image distortion so that there is a nonuniform electrical output from the photocell upon motion of objects in the given field of view. The nonuniform electrical output establishes pulses which are passed to a timer and continually resets the timer so long as there is motion detected. Upon discontinuance of any motion in the field of view, no further pulses are passed to reset the timer, and the timer times out to de-energize an electrical load. This may be an electrical lamp illuminating the field of view, or it may be an electric soldering iron or typewriter which is de-energized when the person has left the room.

23 Claims, 9 Drawing Figures

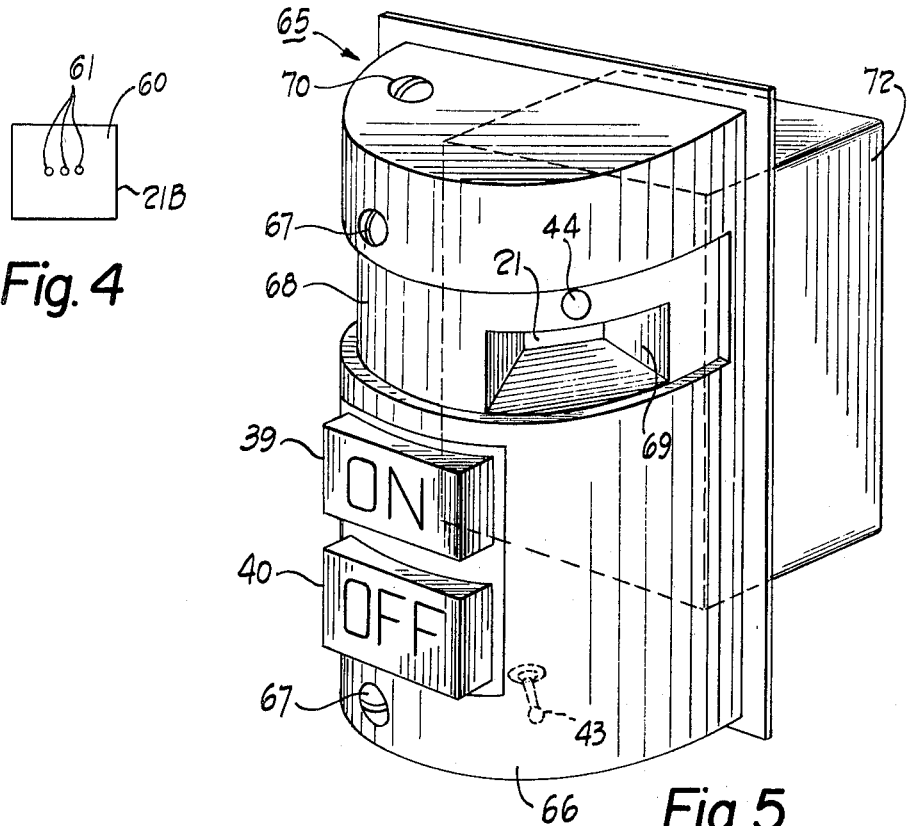
Fig. 4
Fig. 5
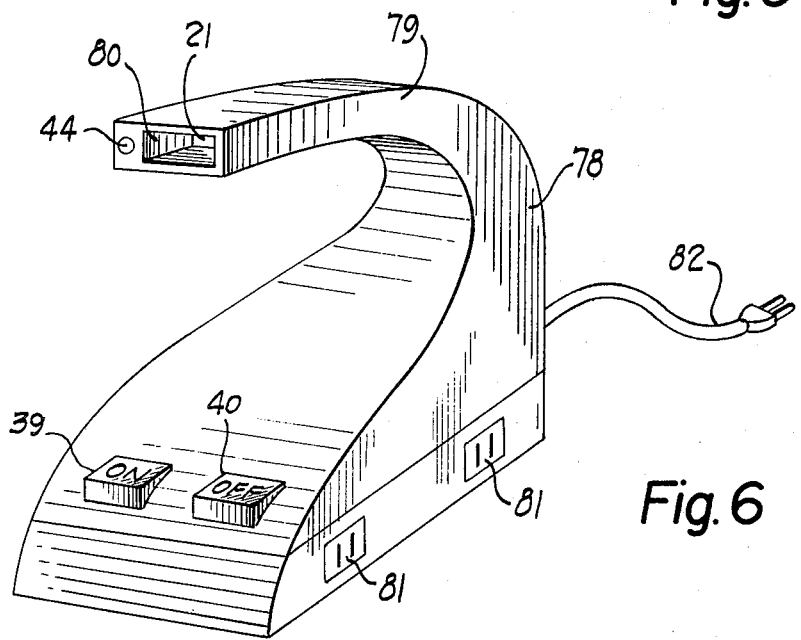
Fig. 6

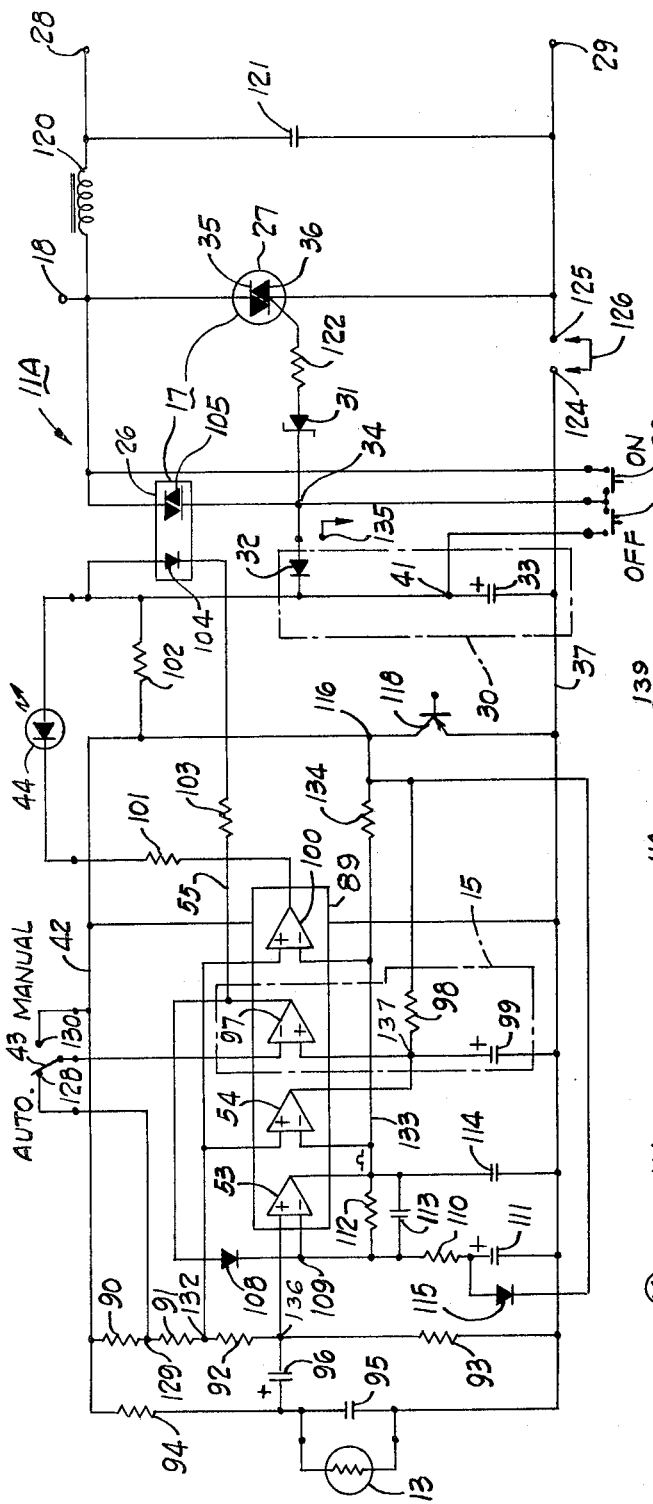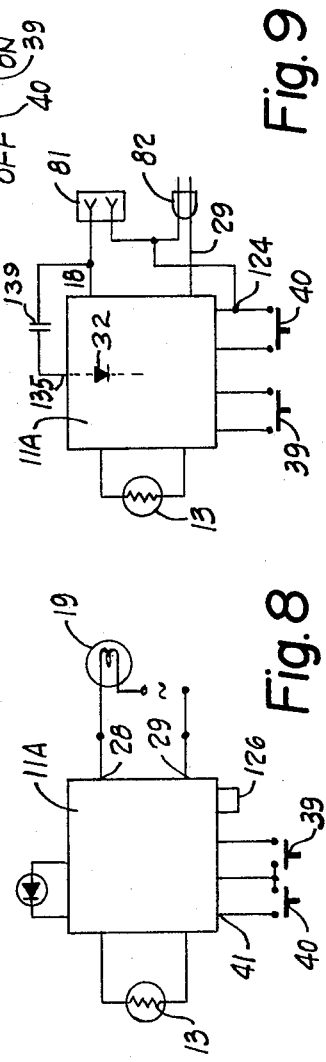
Fig. 7
Fig. 8
Fig. 9

MOTION DISCONTINUANCE DETECTION SYSTEM AND METHOD

This is a continuation of application Ser. No. 249,068, filed Mar. 30, 1981.

BACKGROUND OF THE INVENTION

The present invention relates to electrical systems controlled by motions of objects, for instance, electrical load switches, traffic lights, etc.

Various systems are already known in the prior art for detection of motion in a particular field of view. These systems include optical, ultrasonic, electromagnetic, and electrostatic, among other methods. All of these differ by the accuracy, reliability of detection, and cost of manufacture and installation. All of these systems are intended to detect motion and, determined by such detection of motion, to control appropriate electrical devices. However, up to the present time, no adequate equipment has been proposed for electrical switches. One of the reasons for this is the relatively complicated construction of known motion detectors, and a common purpose among all of these prior art systems is that they are used to detect the presence of motion.

U.S. Pat. No. 2,016,036, for example, disclosed a photoelectric system which utilized a grating disposed in front of each of two photoelectric cells so that the two photoelectric cells were affected differently by the motion of an object in the field of view, and hence, even though there was considerable ambient light, the motion of objects could be detected.

U.S. Pat. No. 2,142,378 utilized two photoelectric tubes with the light from a given field of view falling alternately on the two tubes by means of apertured light intercepting screens. By this means, the speed and direction of movement of an object could be determined.

U.S. Pat. No. 2,774,961 discloses a moving object indicator which utilizes two optical density wedges having continuous density gradations. Light from a field of view passes through these wedges to two separate photocells, which are connected in a bridge circuit. The bridge is normally balanced so that if there is no movement of the objects, there is no output from the moving object indicator. When a moving object is detected, this unbalances the bridge to provide an electrical output.

U.S. Pat. No. 3,972,021 discloses a field of view scanned by a pair of lenses and a beam splitter to illuminate a plurality of photoelectric detectors. The system detects the presence of motion within the field of view.

All of these known systems are relatively complicated, and are systems having a construction which detects the presence of motion of objects within the field of view.

The problem to be solved, therefore, is how to construct a system and the method of operation of a system which will determine when a person has left a room, thus de-energizing the lights in the room or some electrical appliance such as an electric soldering iron or an electric typewriter within the room.

Further, all known photodetectors and adjustable switches require a power supply independent of the power line to the load. This makes wiring more complicated and increases production and installation costs. The problem to be solved, therefore, includes how to establish a photodetector system which does not require any independent power supply.

SUMMARY OF THE INVENTION

This problem is solved by a detection system for determining the discontinuation of motion, comprising in combination an electrical circuit having a detector and photosensitive means, imaging means to establish illumination on said photosensitive means from a given field of view, image distortion means included in one of said imaging means and said photosensitive means to establish nonuniform electrical output of said photosensitive means upon motion of objects in said given field of view effecting a change in illumination on said photosensitive means, timer means connected to close load switch means and having an input from said detector, said timer means having a given time period at the expiration of which said load switch means are opened unless said timer means is reactivated during said given time period, and means connecting the output of said photosensitive means to said detector to detect a change in illumination on said photosensitive means to reactivate said timer means.

The problem is further solved by a motion detection system, comprising, in combination, an electrical circuit having a detector connected to the output of photosensitive means, imaging means to establish illumination on said photosensitive means from a given field of view, image distortion means included in one of said imaging means and said photosensitive means to establish nonuniform electrical output of said photosensitive means upon motion of objects in said given field of view, a housing for said electrical circuit, shield means in said housing establishing at least a part of said given field of view and shielding said photosensitive means from direct illumination from electrical illuminating means of said field of view, and timer means connected to the output of said detector adapted to maintain energization of the terminals of the illuminating means upon motion of objects in said given field of view and de-energization of the terminals of the illumination means upon passage of a given time period subsequent to discontinuance of motion of objects in said given field of view.

The problem is further solved by the method of utilizing imaging means, photosensitive means, and a timer for determining an appropriate time to de-energize an electrical load usable in the presence of humans in a room, said method comprising the steps of establishing the light reflected by objects in a given field of view in the room to be directed by the imaging means to illuminate the photosensitive means, providing image distortion means to establish nonuniform illumination of said photosensitive means upon motion of objects in said given field of view, and connecting the timer to the photosensitive means and to terminals of the electrical load to establish continued energization to the electrical load terminals upon detection of motion in said given field of view and to establish de-energization of the electrical load terminals upon the passing of a given period of time subsequent to the discontinuation of motion in said given field of view.

An object of the invention, therefore, is to detect the discontinuance of motion within a room in order to turn off the lights in the room.

Another object of the invention is to provide a motion discontinuance detector which will control, through a timer, an electrical load.

A further object of the invention is to provide a photosensitive system which supplies its own power from the voltage supply terminals.

A still further object of the invention is to provide an apparatus which will function with at least the same accuracy in detecting motion as heretofore obtainable in the prior art devices, but which has simpler circuitry which does not require tuning and which can be easily manufactured and installed at an appreciably lower cost.

Another object of the invention is to provide a motion detector combined with an electrical switch in order to control power flow by detecting motions of the objects.

Another object of the invention is to provide a circuit which obtains power for the motion detector and switch directly from the load power supply terminals in order to use the proposed system instead of a conventional electromechanical switch without requiring an additional power line for the operation of the motion detector system.

Accordingly, the present system is characterized by a motion detector of any desired construction, with the output thereof being connected directly or indirectly to the restarting input of a timing circuit. An output of the timing circuit is used to control various systems utilizing the fact of discontinuance of motion. The timing circuit measures a given time interval, and it is returned to the start of such interval by every output signal of the motion detector. Upon the timing circuit's timing out, an output signal is given which indicates that there has been a discontinuance of motion detected in the motion detector's field of view during a predetermined time interval. This means the present system produces an output signal change upon the discontinuance of motion, not by the presence of motion.

A feature of the present invention is to provide simple and inexpensive motion detectors which can be effectively utilized even in such common devices as wall switches for electric lights in a room.

The system described in the present application utilizes a solid state switch, such as a thyristor, a reverse blocking triode thyristor, or bidirectional triode thyristor. Therefore, the load is connected in series with such thyristor. Each such thyristor has a voltage drop across the main terminals while the power is on. This drop in voltage may be enhanced by an additional threshold device, for example, a Zener diode, in series with the gate, and the voltage developed by such voltage drop is sufficient to supply energy to the motion detector electrical circuit. In such a case, the control system and solid state switches are both connected in series with respect to the load, and consume energy only when the load is energized. The series connection does not require an additional power line to the electrical motion detector circuit, as it would if it were connected in parallel, and therefore the motion-controlled switch can be used as a direct replacement for any conventional switch, e.g., a wall switch, etc. The present invention is therefore applicable in a broad field of energy conservation, for example, turning off the lights in a nonoccupied room of a dwelling.

Other objects and a fuller understanding of the invention may be had by referring to the following description and claims, taken in conjunction with the acompanying drawings.

BRIEF DESCRIPTION OF THE DRAWINGS

FIG. 4 is an elevational view of a screen having pinholes;

FIG. 5 is an isometric view of the housing for a wall switch and photosensitive detector; and FIG. 6 is an isometric view of a housing for a desk-mounted motion discontinuance controlled switch;

FIG. 7 is a schematic diagram of the preferred embodiment of the main portion of the electrical circuit;

FIG. 8 is a schematic diagram of the circuit of FIG. 7 connected in a wall switch assembly; and FIG. 9 is a schematic diagram of the circuit of FIG. 7 connected in a desk-top switch assembly.

DESCRIPTION OF THE PREFERRED EMBODIMENTS

The present invention is directed to a motion discontinuance detector system and method utilizing a motion detector 11. This detector 11 has an output signal which is present so long as moving objects are present in the field of view. As an example, in a living room, people cannot remain without any motion for any substantial period of time, for example five minutes. The motion detector 11, combined with a timer, can produce in this case an output signal, for example when no motion has been detected during a five-minute period, and thus, presumably, the room is unoccupied. This signal can be used to turn off the lights in the room.

Figure 1:
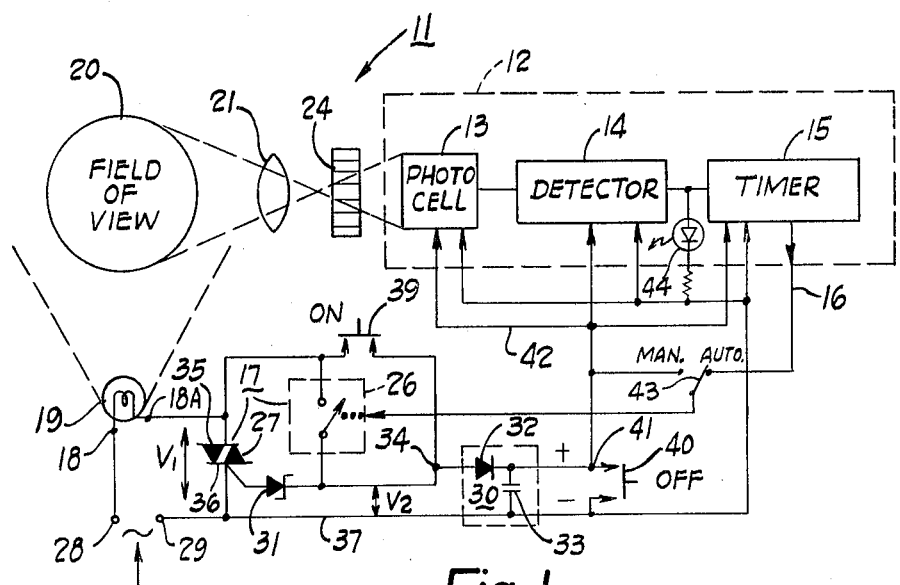
FIG. 1 is an electrical circuit diagram of the motion-controlled switch.

FIG. 1 illustrates the electrical circuit diagram of this motion detector 11. The detector 11 includes an electrical circuit 12 having photosensitive means illustrated as a photocell 13, which may be one of many types such as photoemissive, phototransitive or photoresistive. The output of the photocell is connected to a detector 14, and the detector in turn is connected to a timer 15. The timer 15 has an output at 16 which is connected to load switch means 17, which in turn is connected to load terminals 18, 18A of an electrical load 19. In the embodiment of FIG. 1, this electrical load 19 is illustrated as an electrical lamp which may illuminate a given area, including a field of view 20. Illumination from this field of view, including the illumination reflected from the lamp 19, is directed by imaging means 21 to the photosensitive means 13. Image distortion means 24 may be provided in the photocell 13 or, as shown, may be part of the imaging means 21 by a separate element positioned between the imaging means 21 and the photocell 13. The imaging means in this embodiment is shown as a single lens to pass radiation or illumination from the field of view to the photocell 13.

The load switch means 17 includes, in this embodiment, a set of timer contacts 26 and a solid state switch 27. An optically isolated Triac driver, for instance, may be used as a timer contact means 26. The solid state switch may be a reverse blocking triode thyristor or may be, as shown, a bidirectional triode thyristor such as a Triac. This Triac has the two main terminals thereof connected in series with the load terminals 18 and in series with voltage supply terminals 28 and 29. These supply terminals may be energized with an alternating voltage supply, for example, 117 volts A.C. supply.

A power supply 30 is provided to supply operating voltages to the electrical circuit 12, and this includes a breakdown diode such as a Zener diode 31, a diode rectifier 32, and a filter capacitor 33. The Zener diode is connected between the gate of the Triac 27 and a control terminal 34. The normally open timer contacts 26 are connected between this control terminal 34 and a main terminal 35 of the Triac 27. The other main terminal 36 of the Triac 27 is connected to a common line 37 connecting one terminal 29 of the voltage supply source and the power supply 30. A momentary contact ON switch 39 is connected between the Triac terminal 35 and the control terminal 34. A momentary contact OFF switch 40 is connected across the filter capacitor 33, which supplies an operating voltage at a power supply output terminal 41. This power supply output terminal 41 is connected to a line 42, supplying an operating voltage to the electrical circuit 12, which may include the photocell 13, detector 14, and timer 15. The common or ground line 37 is also connected to these same electrical components for a return circuit.

A manual or automatic switch 43 is connected in the timer output line, and an indicating LED diode 44 is connected to the output of the detector 14.

Operation

Figure 2:
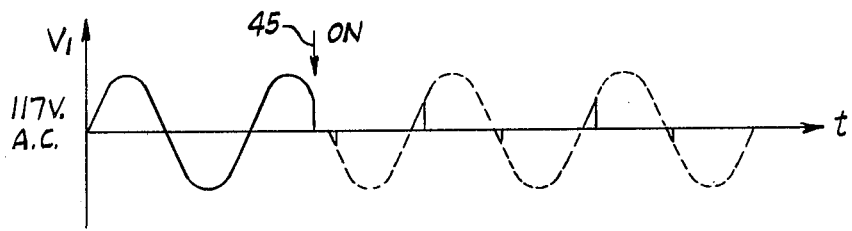
FIG. 2 is a voltage-versus-time diagram of the voltages available in the circuit.
Figure 2:
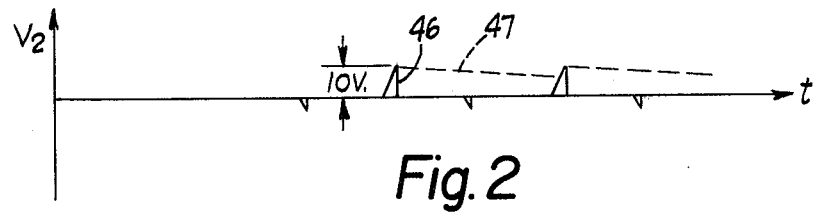

The lamp 19 may be used to illuminate a field of view 20 and to provide general illumination in a room (not shown). To establish this illumination, the ON switch 39 may be momentarily pressed. This supplies voltage available at the Triac terminal 35 through the Zener diode 31 to the gate of this Triac, to fire the Triac. Prior to starting, there is a voltage $V_1$ as shown in FIG. 2, which is impressed across the terminals 35 and 36 of the Triac. At the time 45, shown in FIG. 2, when the ON switch 39 is depressed, this voltage $V_1$ is impressed on the gate to fire the Triac. When the Triac conducts, this illuminates the lamp 19, illuminating the field of view 20. The illumination from this field of view is passed by the lens 21 through the image distortion means 24 to the photocell 13 which has an output detected by detector 14 and energizing the timer 15. This timer 15 is energized at a reset or restarting terminal, and hence the timer 15 has an electrical output to close the timer contacts 26. These are in parallel with the momentarily closed ON switch terminals, and the closing of the timer contacts 26 means that the ON switch may be released. The timer contacts 26 will remain closed, thus continuing to provide voltage to the gate of the Triac 27. The Zener diode 31 might have a breakdown voltage, for example, of 10 volts, aas shown by the voltage $V_2$ in FIG. 2. This momentary spike of voltage 46 is passed by the diode 32 to charge the capacitor 33. This supplies a unidirectional operating voltage to the electrical circuit 12. This electrical circuit may have minimal drain current, and hence the operating voltage may be as shown by the dotted line 47, which will supply a satisfactory operating voltage to power the electrical circuit 12. By this means, the Triac is fired once each half-cycle to keep the lamp 19 energized, and the small spikes of voltage 46 once each cycle provide the operating voltage for the electrical circuit 12.

The image distortion means 24 is one establishing alternating conditions and may be a grating of alternate transparent and opaque bands to cause the image of the objects which falls on the photocell to be broken into a series of light and dark bands. By this means, any motion of objects within the field of view 20 will cause a variation in the illumination falling on the photocell, and hence a variation in the output of such photocell. Accordingly, the photocell will have pulses of electrical output, and these pulses are passed by the detector 14 to reset the timer 15 each time there is motion of objects within the field of view. The timer may have a long time period, for example two minutes, or preferably five minutes, because it has been determined that human beings do not remain motionless for such a long time period. The load terminals 18, 18A may control such things as an electric soldering iron or an electric typewriter, for example, which may be de-energized after the given time period of two to five minutes after a person leaves the room, so that there is no more motion detected within the field of view 20.

Figure 3:
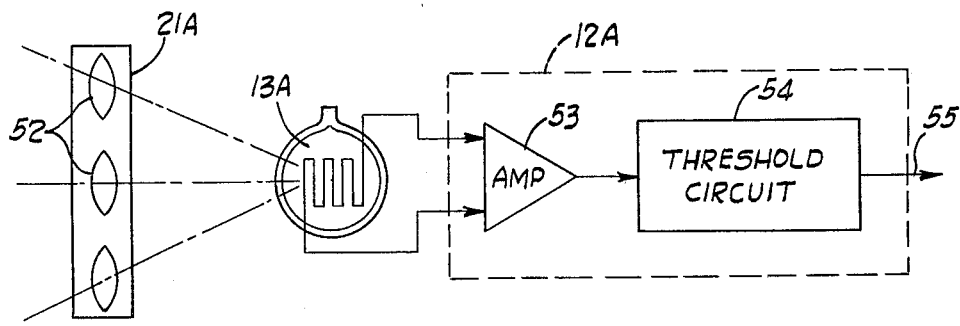
FIG. 3 is a schematic block diagram of a modification of the invention.

FIG. 3 illustrates a modification of the invention, wherein the imaging means 21A includes three lenses 52. These three lenses supply different images from the field of view 20 onto the photocell 13A. This photocell is one which is provided with a sinuous photosensitive surface so as to provide inherently the alternating conditions of the image distortion means within the photocell 13A. Any motion detected in the field of view is passed by the plural lenses 52 to provide nonuniform illumination of the photosensitive surface of the photocell 13A. The nonuniform illumination provides nonuniform electrical output, which is supplied to the differential inputs of an amplifier 53 within the electrical circuit 12A. These pulses are amplified by the amplifier 53 and passed to a threshold circuit 54, with the output thereof at 55 being passed to the timer 15 of FIG. 1.

FIG. 4 illustrates another embodiment of the invention which includes an opaque screen 60 having a plurality of pinholes 61. These plural pinholes may provide the imaging means 21B to replace the imaging means 21 of FIG. 1 or 21A of FIG. 3. Such pinholes do not provide as great a degree of illumination on the photocell as the lenses of FIG. 3; however, they provide a very good image because of the great depth of field.

FIG. 5 illustrates a housing 65 for the motion detector 11. This housing 65 may take many different forms and, in the embodiment of FIG. 5, the housing consists of a body 66 which can be fastened into the usual electrical outlet wall box (not shown) with holding screws 67. The motion detector 11, including the lens and the photosensitive means, may be positioned in the rotatable cylinder 68, and this cylinder has a blind or shield 69 to define the field of view of the imaging means 21. The cylinder 68 may be rotated to the desired field of view and then the cylinder may be clamped by a clamping screw 70.

The electrical circuit 12 may be located in the compartment 72 which is attached to the body 66 and which will fit within the electrical outlet box (not shown). The body 66 carries the push buttons for the momentary close ON switch 39 and OFF switch 40 The indicator LED diode 44 may be provided in the body 6 and, optionally, the manual-automatic switch 43 may be located on the body 66 in any convenient location, such as on the lower surface thereof.

Anoher embodiment is shown in FIG. 6 for a desktop housing 78 or the like which has a curved neck 79 at the end of which is a blind or shield 80 to shield the imaging means 21. In the base of the housing 78 there may be contained the electrical circuit 12 and electrical outlets 81 into which a lamp or appliance may be plugged for control of such lamp or appliance. A flexible cord and plug 82 may be plugged into the usual convenience outlet to provide power to the appliance plugged into the outlet 81 and also to provide power to the electrical circuit 12, as set forth above. The ON and OFF switches 39 and 40 may be provided in a convenient location on the housing 78, and also the LED indicator diode 44 may be provided, for example, near the imaging means 21.

FIG. 7 is a schematic diagram of the complete electrical circuit and many miniaturized components are utilized so that the entire circuit 11A of FIG. 7 may be provided on a printed circuit board, with the exception of some peripheral components such as the indicator diode 44, the manual/automatic switch 43, the photocell 13, and the ON/OFF switches 39, 40. Many reference numerals on FIG. 7 are the same as in FIG. 1 to show the correspondence between the two circuits.

Power supply operating voltages are obtained across the lines 42 and 37, and a voltage divider is provided thereacross including resistors 90, 91, 92, and 93. A resistor 94 and capacitor 95 are also connected across these power supply lines, with the photocell 13 (in this embodiment a photoresistor) connected across the capacitor 95. A capacitor 96 is connected between the junction of resistor 94 and capacitor 95, and the junction between resistors 92 and 93. This same junction is connected to the noninverting input of the amplifier 53, which is one of a package of four such amplifiers in a group, packaged for convenience, for example, in a DIP package 89. The next op amp in the package is connected as the threshold circuit 54, as in FIG. 3. An op amp 97 is connected as a part of the timer 15, which includes a resistor 98 and a capacitor 99. The last op amp 100 in the package is connected as an amplifier to drive the indicator LED diode 44 through a resistor 101 to the power supply terminal 41. A resistor 102 connects this power supply terminal 41 to the positive supply line 42.

The output of the timer amplifier 97 is connected through a resistor 103 to the Triac driver 26, which includes an opto-isolator device, namely, a light-emitting diode 104 and a photodiac 105. This Triac driver 26 may be considered an equivalent of the timer contacts 26 in FIG. 1, and is connected between terminals 18 and 34.

The output of the timer amplifier 97 is also connected through a diode 108 to a terminal 109, which is connected to the inverting input of amplifier 53. Terminal 109 is connected through a resistor 110 and a capacitor 111 to the negative power supply line 37. A resistor 112 and capacitor 113 are connected in parallel from the output of amplifier 53 to the terminal 109. A capacitor 114 is connected from the output of amplifier 53 to the negative supply line 37. A diode 115 is connected from the junction of resistor 110 and capacitor 111 to a terminal 116, which is connected to the positive supply line 42. A transistor 118, with base left open, is connected between the terminal 116 and the negative supply line 37.

The power supply 30 is connected, as in FIG. 1, to supply a positive DC operating potential at terminal 41. The OFF switch 40 is connected between terminals 34 and 41, and the ON switch 39 is connected between terminals 18 and 34. The main terminals 35 and 36 of the Triac 27 are connected across terminals 18 and 29. A small series inductance 120 is connected between terminals 18 and 28, and a parallel capacitor 121 is connected across terminals 28 and 29. This inductance and capacitance is for surge current protection to the Triac 27. The gate of the Triac 27 is connected through a resistor 122, and the Zener diode 31 to the terminal 34. Terminals 124 and 125 are connected by an optional jumper 126 in order to interconnect terminal 29 with a negative supply line 37. The manual-automatic switch 43 has the wiper of the switch connected to the inverting input of the timer amplifier 97, and the automatic terminal 128 connected to a junction 129 between resistors 90 and 91 in the voltage divider. The manual terminal 130 of the switch 43 is connected to the positive supply line 42. A junction 132 between resistors 91 and 92 on the voltage divider is connected to the noninverting input of amplifiers 54 and 100. The inverting inputs of these amplifiers 54 and 100 are connected to a line 133, which is connected through a resistor 134 to the terminal 116. The diode 32 may be connected to conduct from terminal 34 to terminal 41 or, alternatively, may be connected to conduct between a terminal 135 and the terminal 41.

Operation

FIG. 7 illustrates one practical circuit which will put into practice the objects of the invention. The circuit 11A of FIG. 7 may be connected in either the wall switch assembly of FIG. 5 or the desk-top assembly of FIG. 6. FIG. 8 illustrates how this circuit 11A might be connected in the wall switch assembly of FIG. 5 to control the lamp load 19 from the voltage source connected at terminals 28 and 29. In this circuit, jumper 126 connects terminals 124 and 125. In this connection, the circuit 11A controls the room illumination and a major portion of the room, or a portion selected by rotating cylinder 68, would be the field of view 20. When a person enters the room, he depresses the ON switch 39 for a short period of time, for example one-half second. In the circuit of FIG. 7, it will be noted that this interconnects terminals 18 and 34 to energize the gate of the Triac 27 and cause it to fire, thus establishing a closed circuit between terminals 28 and 29. This will illuminate the lamp 19. The small spikes of voltage 46 shown in FIG. 2 are those established by the Zener diode 31, and these are passed to the power supply 30 to establish a d.c. operating voltage at the terminal 41 and through resistor 102 on the positive d.c. conductor 42. The capacitor 33 may be large for a large filtering capacity, so that an essentially d.c. voltage is applied to the conductor 42. The transistor 118, with an open base connection, is connected to operate in the Zener mode for a regulating function of maintaining a substantially constant voltage on the conductor 42, e.g., 7 volts. This voltage is applied to the voltage divider 90, 91, 92, 93, to establish the operating conditions of the four op amps in the package 89. The resistors 90 and 91 may be of relatively large value compared to the resistance value of resistors 92 and 93. Thus, the potential at terminal 136 may be low, for example, only about 2 volts. The photocell 13 in this embodiment is a photoresistor having a high impedance when dark and a considerably lower impedance when light strikes the photocell. Initial application of light on this photocell is passed as a pulse of voltage through the capacitor 96 to the amplifier 53. The feedback resistor 112 may be of a very large resistance value for a high gain of this amplifier. The light pulse is therefore amplified as a voltage a.c. pulse on the output of the amplifier 53. The amplifier 54 is used as a threshold detector and the potential of terminal 132 might be a low voltage, for example, 2 to 3 volts. The capacitor 99 may be of large value and resistor 98 may be of large value for establishing an RC time constant of two to five minutes.

Upon closing the ON switch 39 and conduction of Triac 27, the capacitor 99 immediately starts to charge at terminal 137, slowly, through resistor 98 from terminal 116. This initially is a lower positive voltage on the noninverting input of op amp 97 than on the inverting input from terminal 129 of the voltage divider. Consequently, op amp 97 has a negative output on line 55 to turn on the LED 104 and turn on the photodiac 105, which keeps the Triac 27 turned on. All this occurs within a few cycles of the 60 Hertz applied power and then the person entering the room may remove his finger from the momentary close ON switch 39 and the room lights will stay energized.

The motion being detected within the room will cause variations of impedance on the photoresistor 13. The normal variations on this resistor caused by changes of illumination, for example, the 120 Hertz variations from fluorescent lamps on a 60 Hertz power supply, will be filtered out by the capacitor 95, so they will not be passed by capacitor 96. However, motion changes within the room through the imaging means 21 and image distortion means 24 will cause voltage changes to be passed by the capacitor 96 to the amplifier 53. These motion changes are therefore transformed into an alternating voltage wave on the output of this amplifier 53. Since the feedback resistor 112 is a very large resistance, for example, 10 megohms, the amplifier 53 has a very high gain. Consequently, the alternating voltage output of the amplifier 53 will be applied to the threshold detector 54 on the inverting input thereof, and these alternating voltage waves will have portions exceeding the threshold established by the potential at voltage divider terminal 132.

When such threshold is exceeded, the output transistor of the threshold detector op amp 54 will be saturated, and hence have an impedance of only 2 or 3 ohms, which will immediately discharge the capacitor 99. This is a resetting or restarting of the timer 15 by the discharge of the capacitor 99. By this means, the noninverting input of the timer op amp 97 will normally, with room illumination and movement within the room, be at a positive potential less than that established on the inverting input from the voltage divider terminal 129. This potential might be 5 to 6 volts positive. This positive voltage on the inverting input establishes a large negative voltage on the output of op amp 97 to maintain the LED 104 illuminated, the photodiac 105 conducting, and Triac 27 conducting. As each movement within the room is detected, this again discharges the capacitor 99, or in effect restarts or resets the timer 15. Thus, as long as the room is occupied, the slight movements of the occupants or movements made by objects moved by the occupants will be detected by the circuit 11A to keep capacitor 99 discharged and the Triac 27 energized for continued room illumination.

When the occupant leaves the room and does not turn off the lights by means of the OFF switch 40, then no further motion will be detected within the room. This discontinuance of motion will be detected by the circuit 11A because there will no longer be any a.c. variations to amplifier 53 and no longer any discharging of capacitor 99 through the threshold detector 54. This means that through the large value resistance 98, the capacitor 99 will slowly charge. When the potential across this capacitor 99 reaches the 5 or 6-volt value of terminal 129 of the voltage divider, then the timer op amp 97 will time out by switching from a negative output to a positive output. This turns off the LED 104 and turns off the photodiac 105 and Triac 27.

The initial turnoff of the room lights is a change of illumination which will be detected by the circuit 11A because the large capacitor 33 is still charged as a part of the power supply. The lights might turn on again except for the circuit established by diodes 108 and 115. Initial positive output of the timer op amp 97 on the output line 55, for turn-off, is passed by diode 108 and this voltage at the d.c. supply voltage of seven volts, for example, will drive the amplifier 53 heavily negative at its output on line 133. This helps to discharge the capacitor 33 through resistors 134 and 102. The positive voltage supplied through diode 108 also starts to charge capacitor 111 and so diode 115 will discharge this capacitor 111 through transistor 118. This diode 115 also has the function of permitting the circuit to be turned on quickly by the manual switch 39, once it has been turned off. It establishes the discharge of capacitor 99, so it is below its threshold value, and hence the circuit may be turned on quickly.

FIG. 9 shows how the circuit 11A of FIG. 7 may be used in the desk-top switch assembly such as that shown in FIG. 6. The cord and plug assembly 82 is connected between terminal 29 and one terminal of the electrical outlet 81. The other terminal of this outlet 81 is connected to terminal 18. An external capacitor 139 may be connected between this terminal 18 and terminal 135, with the diode 32 connected between this terminal 135 and terminal 41.

The capacitor 139 may have a 120-volt rating for a 117-volt a.c. input, although if it is a 230-volt a.c. input this capacitor 139 is rated accordingly at 250 volts, for example. This capacitor supplies energy to the circuit 11A in parallel with the outlet 81, and does so through the diode 32.

This desk-top assembly of FIG. 6 may be used to control a desk lamp, for example, or some appliance such as an electric typewriter, with such lamp or appliance plugged into the outlet 81. Assume that the desk-top unit of FIG. 6 is not controlling any illumination within the room, i.e., not controlling a desk-lamp, but is controlling only an electric typewriter. Also assume that there is sufficient illumination in the room for the occupants. Then when the typewriter is turned on, this establishes an electrical circuit through the outlet 81 so that a potential is applied on terminal 18, and from this terminal, through capacitor 139 and diode 32, the circuit 11A is energized so that this circuit will be responsive to movement within the room and will also be responsive to discontinuance of this movement, so that two to five minutes later, the Triac 27 will cease conduction and turn off the electric typewriter.

It will be noted that the indicating LED diode 44 will be flashing each time motion has been detected to provide an indication of proper operation of the circuit 11.

The manual-automatic switch 130 is an option which may be provided if desired. The circuit has been described with this switch 43 in the automatic position, but when the switch is changed to the manual position, the circuit is operable manually merely by pressing the ON or OFF switches 39 or 40, respectively.

The motion detector 11 has contained therein the timer 15 so that an output signal is produced when no motion has been detected for a given period of time after the last detected motion. This signal is used to turn off the lights in a room, for example, or to turn off some electrical appliance. Each time motion is detected, the timer 15 is restarted or reset and begins to count time again from time zero. The output signal from the timer will occur only if the intervals between motions of the objects within the field of view are greater than the preset time interval. This may be two to five minutes, for example. Since this motion detector 11 utilizes only "yes" or "no" type information corresponding to the presence or discontinuance of motion, this detector can utilize the simple and inexpensive motion detector shown in FIGS. 1 and 7. Motion detectors known from the prior art can detect motion as well as direction, speed, etc., and therefore often are relatively complicated. The present invention, therefore, utilizes a circuit which is relatively simple and reliable, yet inexpensive and requiring no tuning, and one which can be made relatively sensitive to detect small amounts of motion within the field of view. Additionally, the shields or blinds 69 and 80 can select the desired field of view and, at the same time, can shield the photosensitive means 13 from ambient light, such as light from a window or overhead room illumination lights. This means that the photosensitive means 13 is responsive primarily to reflected light from objects within the field of view 20.

The image distortion means 24, 21A and 13A, or 21B and 13B is one which breaks the image into several different areas which affect the photosensitive means 13. The imaging means can include one or several lenses or one or several pinholes, so that any objects or subjects moving within the field of view establish light modulations on the surface of the photosensitive means 13 and, consequently, a pulse is produced by the detector 14.

The power supply 30 establishes an operating voltage for the operation of the electrical circuit or any part thereof without the necessity for supplying a separate pair of conductors to this power supply. This power supply 30 obtains its energy from the motion detector circuit 11 itself, so that only connections of the detector circuit to the voltage supply terminals 28 and to the load terminals 18 are required. Accordingly, the motion detector of FIGS. 1, 3 and 7 is powered while the load 19 is powered and the motion detector circuit 11 does not consume any energy during the OFF condition. The motion detector 11 is turned on manually by the ON switch 39, and thereby the load 19 is energized from the voltage supply terminals 28. While people are in the vicinity of the switch and these people are moving, their every motion produces the output signals from the motion detector 14, which returns the timer 15 to the starting position. Once the person has left the room or the field of view 20, then when the timer times out, the load 19 is de-energized, and also the power supply 30 is de-energized so it does not consume any power. FIG. 5 shows how the motion detector may be built into the ordinary wall switch and FIG. 6 illustrates how the motion detector may be housed in a desk-top type of housing to monitor the motion of a person at the desk or at a workbench. Also, the motion detector 11 may be built directly into the electrical appliance, such as the electric typewriter, electric desk lamp, or electric soldering iron used at a workbench, and thus can become a part of these electrical appliances, thus making them not only more energy-efficient, but also safer in terms of fire, etc.

The circuit of the motion detector of FIG. 1 may be constructed in several ways, with FIG. 7 illustrating one practical circuit which has been constructed and satisfactorily operated. As an example, the values of the circuit components in FIG. 7 may be as follows:

| Ref. No. | Component | Value | Type |
|---|---|---|---|
| 13 | photoresistor | | C1 700 |
| 26 | opto-coupler | | MOC 3020 |
| 27 | Triac | | 1R 106 B1 |
| 31 | Zener diode | | 1N 714 A |
| 32 | diode | | 1N 4001 |
| 89 | quad op amp | | 2M 339 |
| 108 | diode | | 1N 914 |
| 115 | diode | | 1N 914 |
| 118 | transistor | | 2N 4916 |
| 120 | inductance | 100 μH | |
| 33 | filter capacitor | 50 mfd | 15V |
| 95 | capacitor | .2 mfd | 10V |
| 96 | capacitor | 1.0 mfd | |
| 99 | capacitor | 50 mfd | aluminum |
| 111 | capacitor | 10 mfd | |
| 113 | capacitor | .01 mfd | |
| 114 | capacitor | .1 mfd | |
| 121 | capacitor | .1 mfd | 200V |
| 139 | capacitor | .1 mfd | 120V or 250V |
| 90 | resistor | 1 megohm | |
| 91 | resistor | 1.5 megohm | |
| 92 | resistor | 220 K ohm | |
| 93 | resistor | 550 K ohm | |
| 94 | resistor | 68 K ohm | |
| 98 | resistor | 4.7 megohm | |
| 101 | resistor | 3.3 K ohm | |
| 102 | resistor | 1.2 K ohm | |
| 103 | resistor | 3.3 K ohm | |
| 110 | resistor | 10 K ohm | |
| 112 | resistor | 10 megohm | |
| 122 | resistor | 100 ohms | |
| 134 | resistor | 47 K ohm | |

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A detection system for determining the discontinuation of motion, comprising, in combination:
an electrical circuit having a detector and photosensitive means;
imaging means to establish illumination on said photosensitive means from a given field of view;
alternating condition image distortion means included in one of said imaging means and said photosensitive means to establish nonuniform electrical output of said photosensitive means upon motion of objects in said given field of view effecting a change in illumination on said photosensitive means;
timer means connected to close load switch means and having an input from said detector;
said timer means having a given time period at the expiration of which said load switch means are opened unless said timer means is reactivated during said given time period;
means connecting the output of said photosensitive means to said detector to detect a change in illumination on said photosensitive means to reactivate said timer means;

means to supply from the closed condition of said load switch means an operating voltage to at least part of said electrical circuit so as to have an output from said timer means adapted to close said load switch means; and electrical means including a semiconductor and responsive to the initial change of illumination upon turn-off of illumination to activate said semiconductor to assure continued open condition of said load switch means.

2. A detection system as set forth in claim 1, including means to manually establish a closed condition of said load switch means to energize said at least part of said electrical circuit.

3. A detection system as set forth in claim 1, wherein said image distortion means includes a plurality of lenses.

4. A detection system as set forth in claim 1, wherein said image distortion means includes a nonuniform photosensitive means.

5. A detection system as set forth in claim 1, wherein said image distortion means includes at least one pinhole aperture positioned between said photosensitive means and said field of view.

6. A detection system as set forth in claim 1, wherein said supply means is power supply means connected to receive a voltage in accordance with said load switch means in the closed condition, and means to supply an operating voltage to said electrical circuit from said power supply means.

7. A detection system as set forth in claim 6, including a circuit element energized by the closing of said load switch means, and said power supply means connected to be energized from said circuit element.

8. A detection system as set forth in claim 1, wherein said load switch means includes a semiconductor switch having main terminals and a control electrode, means for connecting said main terminals in series with load terminals and alternating voltage source terminals, a Zener diode connected between said control electrode and a control terminal, and a power supply having an input connected between said control terminal and a main terminal of said semiconductor switch to energize said power supply with a maximum voltage corresponding to the breakdown voltage of said Zener diode.

9. A detection system as set forth in claim 1, wherein said load switch means includes a Triac, a Zener diode connected between the gate of said Triac and a control terminal, and a power supply for said electrical circuit connected between said control terminal and a terminal of said Triac.

10. A detection system as set forth in claim 9, including a normally-open, momentary-close start switch connected between the other terminal of said Triac and said control terminal.

11. A detection system as set forth in claim 1, wherein said supply means includes a filter capacitor; and said semiconductor being connected to the output of said timer means and connected to discharge said filter capacitor upon said timer means timing out.

12. A detection system as set forth in claim 1, wherein said supply means includes a filter capacitor;

said electrical means including an amplifier;

the initial turn-off of said part of said circuit being accomplished by said timer means timing out and changing polarity of the output thereof;

said semiconductor being connected to the output of said timer means and passing the changed polarity output thereof to said amplifier to drive the output thereof to a polarity opposite said given polarity; and means connecting said opposite polarity output of said amplifier to said filter capacitor to discharge said filter capacitor.

13. A motion detection system, comprising, in combination:

an electrical circuit having a detector connected to the output of photosensitive means;

imaging means to establish illumination on said photosensitive means from a given field of view;

alternating condition image distortion means included in one of said imaging means and said photosensitive means to establish nonuniform electrical output of said photosensitive means upon motion of objects in said given field of view;

a housing for said electrical circuit;

shield means in said housing establishing at least a part of said given field of view and shielding said photosensitive means from direct illumination from electrical illuminating means of said field of view;

timer means connected to the output of said detector adapted to maintain energization of the terminals of the illuminating means upon motion of objects in said given field of view and de-energization of the terminals of the illumination means upon passage of a given time period subsequent to discontinuance of motion of objects in said given field of view; and electrical means including an amplifier having an output change responsive to the initial change of illumination upon de-energization of the terminals of the illumination means to establish continued de-energization of said illumination means terminals.

14. A motion detection system as set forth in claim 13, wherein said shield means includes a recessed mounting for said photosensitive means to shield said photosensitive means from ambient and overhead light.

15. A motion detection system as set forth in claim 13, including means to movably mount said shield means in said housing.

16. A motion detection system as set forth in claim 15, including means to clamp said movable mount in said housing at a desired orientation.

17. A method of utilizing imaging means, photosensitive means, and a timer for determining an appropriate time to de-energize an electrical load usable in the presence of humans in a room, said method comprising the steps of:

establishing the light reflected by objects in a given field of view in the room to be directed by the imaging means to illuminate the photosenitive means;

providing alternating condition image distortion means to establish nonuniform illumination of said photosensitive means upon motion of objects in said given field of view;

connecting the timer to the photosensitive means and to terminals of the electrical load to establish continued energization to the electrical load terminals upon detection of motion in said given field of view and to establish de-energization of the electrical load terminals and the photosensitive means upon the passing of a given period of time subsequent to the discontinuation of motion in said given field of view; and effecting conduction of a semiconductor upon the initial turn-off of illumination in the room to override the control of the load terminals by the timer for establishing continued deenergization of said load terminals.

18. The method as set forth in claim 17, including supplying electrical power to the electrical circuit, including the photosensitive means and the timer, in accordance with the energization of the load terminals.

19. The method as set forth in claim 18, including terminating the supply of electrical power to the electrical circuit in accordance with de-energization of the electrical load terminals.

20. A detection system for determining the discontinuation of motion, comprising, in combination:

an electrical circuit having a detector and photosensitive means responsive to motion of objects in a given field of view effecting a change in illumination on said photosensitive means;

timer means connected to close load switch means and having an input from said detector;

said timer means having a given time period at the expiration of which said load switch means is opened unless said timer means is reactivated during said given time period;

means connecting the output of said photosensitive means to said detector to detect a change in illumination on said photosensitive means to reactivate said timer means;

means to supply an operating voltage to at least part of said electrical circuit so as to have an output from said timer means adapted to close said load switch means;

electrical means responsive to the initial change of illumination upon turn-off of illumination to assure a continued open condition of said load switch means;

said supply means having an operating voltage of a given polarity;

said electrical means including a semiconductor;

the initial turn-off of illumination being accomplished by said timer means timing out and changing polarity of the output thereof; and said semiconductor being connected to the output of said timer means and connected to pass the changed polarity output thereof to maintain the open condition of said load switch means.

21. A detection system as set forth in claim 20, wherein said supply means has a filter capacitor; and said semiconductor is connected to discharge said filter capacitor.

22. A detection system as set forth in claim 20, wherein said semiconductor is a diode.

23. A detection system as set forth in claim 20, wherein said electrical means includes an amplifier;

a filter capacitor in said supply means and having the same given polarity as said supply means;

said semiconductor being connected to said amplifier to pass the changed polarity output of the timer means to the amplifier to drive the output thereof to the polarity opposite said given polarity; and means connecting the opposite polarity output of said amplifier to said filter capacitor to discharge said filter capacitor.

* * * * *